United States Patent [19]

Kranefeld

[11] Patent Number: 5,322,226
[45] Date of Patent: Jun. 21, 1994

[54] APPARATUS FOR MONITORING AND SECURING ACCESSIBLE DANGER ZONES OF A FIBER BALE OPENER

[75] Inventor: Andreas Kranefeld, Erkelenz, Fed. Rep. of Germany

[73] Assignee: Trützschler GmbH & Co. KG, Mönchengladbach, Fed. Rep. of Germany

[21] Appl. No.: 135,981

[22] Filed: Oct. 14, 1993

[30] Foreign Application Priority Data

Oct. 14, 1992 [DE] Fed. Rep. of Germany ....... 4234606

[51] Int. Cl.⁵ .................. F16P 3/14; D01G 7/00; D01G 31/00
[52] U.S. Cl. .................. 241/37.5; 19/80 R; 241/33; 241/101.7; 241/605
[58] Field of Search .............. 241/33, 37.5, 101.7, 241/605; 19/80 R, 97.5, 82

[56] References Cited

U.S. PATENT DOCUMENTS 4,544,106 10/1985 Haekenbeck et al. ........... 241/101.7
4,813,616  3/1989 Hösel et al. ................. 241/605 X Primary Examiner—Douglas D. Watts
Attorney, Agent, or Firm—Spencer, Frank & Schneider

[57] ABSTRACT

An apparatus for securing danger zones in a bale opening system. The apparatus includes a first beam transmitting/receiving device and a beam guide for guiding the first beam in a generally U-shaped course. A space between the legs of the U-shaped course accommodates conveyor belts on which bales are supported, the bale opener in any position along a path of travel thereof, a shuttle carriage in any position along a path of travel thereof and at least one part of a loading station. The shuttle carriage travels between a loading station where a bale is loaded on the carriage and a location on a conveyor belt where the carriage deposits the bale. The apparatus further has second and third beam transmitting/receiving devices for generating and detecting second and third beams each having a course connecting legs of the U-shaped course in a zone of the loading station. The second beam is more remote from the base of the U-shaped course of the first beam than the third beam. A switching arrangement selectively activates and deactivates the second and third beam transmitting/receiving devices.

12 Claims, 7 Drawing Sheets

APPARATUS FOR MONITORING AND SECURING ACCESSIBLE DANGER ZONES OF A FIBER BALE OPENER

CROSS REFERENCE TO RELATED APPLICATION

This application claims the priority of German Application No. P 42 34 606.1 filed Oct. 14, 1992, which is incorporated herein by reference.

BACKGROUND OF THE INVENTION

This invention relates to an apparatus for monitoring and securing accessible danger zones in a fiber bale opener. The bale opener is of the type that includes a fiber tuft-detaching assembly which travels back and forth along a series of fiber bales. The monitoring and securing apparatus is of the type which has a beam transmitter and receiver spaced from one another in such a manner that upon interruption of the beam between the transmitter and the receiver a signal is triggered which may be used, for example, to immediately stop the machine movements that pose a safety risk. In case of a plurality of danger zones, the beam transmitters and receivers are so arranged relative to one another that the respective associated danger zone may be fully surrounded by the beam path between transmitter and receiver. A signalling device is provided which switches from one beam transmitting/receiving apparatus to another to arbitrarily activate and deactivate the securement of various danger zones.

In travelling bale openers of the above-outlined type, the danger zone to be delimited and secured is approximately as long as the length of the fiber bale series. Since in one type of bale opening systems two parallel bale series are present on either side of the travelling path of the bale opener, the detaching assembly is rotatable 180° about a vertical axis to be situated over either the one or the other bale series and thus the detaching assembly passes from one danger zone to the other. The beam transmitters and receivers are arranged in such a manner that one danger zone is spatially continuously and entirely surrounded by the transmitted beam; the danger zone is that zone in which the detaching device is momentarily found to operate. A further securing apparatus surrounds the other danger zone by its beam at a time when the detaching assembly is situated in the working position in such other danger zone. In this manner, a delimitation and protection of that danger zone is at all times ensured in which the detaching assembly is situated and detaches fiber tufts from the fiber bales.

The detaching assembly comprises a height-variable, cantilever-like construction supported in a travelling tower of the bale opener which moves on rails along the bale series. After having consumed the first bale series on one side of the bale opener, the tower is rotated about a vertical axis 180°. Then, after appropriate height adjustment, the detaching device may work on the second bale series while the area of the first bale series may be provided with a new bale series. This area, after switching the securing apparatus over to the second danger zone, is no longer secured by the optical barriers. Thus, at all times the bale opener works on one bale series while a new bale series on the other side of the bale opener may be placed in readiness.

In a more recent development concerning the detachment of fiber tufts from bales, a bale opener such as a model BLENDOMAT BDT 020 manufactured by Trützschler GmbH & Co. KG, Mönchengladbach, Germany is being used. In this type of bale opening system, the fiber bales are supported on a conveyor belt (hereafter also referred to as a "working belt") and the fiber tuft detaching operation occurs along an inclined top plane of the fiber bale series. In such an arrangement the detaching device operates along an inclined plane and new fiber bales are consecutively introduced into the fiber tuft removal process. Thus, while the first bale of the series being worked on is about to be consumed entirely, the last bale of the bale series which is being worked on just begins to yield the first fiber tufts. With the working belt there is associated an additional conveyor belt (hereafter also referred to as "reserve belt") on which standby fiber bales are positioned. While the bale series being worked on is resupplied with standby bales from the reserve belt, the reserve belt has to be periodically provided with new standby bales. This is done by a shuttle carriage that travels back and forth from a carriage loading location to a location on the reserve belt where a standby bale is deposited from the carriage. The carriage receives a fiber bale in the carriage loading station from a transport vehicle, such as a forklift. The danger zone where risks of accidents are high thus extends from the travelling zone of the bale opener along the working belt, the reserve belt and the loading station for charging the shuttle carriage. For supplying bales to the loading station, usually a transport vehicle must enter and exit, without interrupting the process of supplying bales to the continuous bale detaching operation. At the same time, delimitation and securement of danger zones should be ensured.

SUMMARY OF THE INVENTION

It is an object of the invention to provide an improved apparatus of the above-outlined type by means of which the danger zones, including the reserve belt and the loading station are secured, but which nevertheless permits an entering and exiting of transport vehicles as well as a travel of the shuttle carriage.

This object and others to become apparent as the specification progresses, are accomplished by the invention, according to which, briefly stated, the apparatus for securing danger zones in a bale opening system includes a first beam transmitting/receiving device and a beam guide for guiding the first beam in a generally U-shaped course. A space between the legs of the U-shaped course accommodates conveyor belts on which bales are supported, the bale opener in any position along a path of travel thereof, a shuttle carriage in any position along a path of travel thereof and at least one part of a loading station. The shuttle carriage travels between a loading station where a bale is loaded on the carriage and a location on a conveyor belt where the carriage deposits the bale. The apparatus further has second and third beam transmitting/receiving devices for generating and detecting second and third beams each having a course connecting legs of the U-shaped course in a zone of the loading station. The second beam is more remote from the base of the U-shaped course of the first beam than the third beam. A switching arrangement selectively activates and deactivates the second and third beam transmitting/receiving devices.

By completely surrounding the momentarily operative danger zone by a beam which may be generated by a light source, a laser source, an infrared radiation source or an ultrasonic source, a contacting of the moving machine elements in the danger zone by personnel cannot take place. By providing two beam transmitting-/receiving devices in a limited space, namely, in the zone of the loading station (that is, the location where a bale is transferred from a transport vehicle to the carriage) a lock or sluice is obtained. While the beam surrounds the bale opener, the working belt associated therewith as well as the reserve belt and the loading station essentially in a U-shaped configuration, the beams emitted by the other two transmitters connect the two legs of the U at two different, alternating distances from the base of the U, whereby it is possible to divide the entire danger zone into two individual, partial danger zones. The danger zone in which the bale opener operates may thus be separated from the danger zone where the carriage is loaded and in which the carriage travels.

According to a further feature of the invention, the beams forming the lock may be activated in an alternating manner. This ensures that at least one beam is present which closes off the danger zone, that is, the lock is at all times closed at least on one side.

According to a further feature of the invention, a signalling device is provided which, before the carriage arrives into or after it moves out of the loading station, switches from one beam transmitting/receiving apparatus to another.

The shuttle carriage, as noted earlier, serves for placing standby bales on the reserve belt. It is its function to so set the fiber bales on the reserve belt that they are arranged close to one another and may be readily advanced onto the working belt. For this purpose the shuttle carriage must travel back and forth over the reserve belt to deposit the fiber bales thereonto. Since the motion of the shuttle carriage is initiated by a machine control, the travelling path of the shuttle carriage has to be secured. Therefore, the transfer of the fiber bales onto the shuttle carriage is carried out in the lock; during this process the shuttle carriage is stationary and the outer lock gate is open, that is, the outer transverse beam is deactivated while the inner transverse beam is activated. It is noted that the outer lock gate (or outer transverse beam) is more remote from the base of the U-shaped beam path than the inner lock gate (or inner transverse beam). Upon completion of the bale transfer process, a signalling device switches the lock gates, that is, the inner transverse beam is deactivated after the outer transverse beam has been activated. Thereafter, the shuttle carriage may move in the direction of the bale series, that is, in the direction of the bale opener and may deposit the transported bale onto the reserve belt and press it against the last-deposited bale of the series on the reserve belt. Upon return of the shuttle carriage into the lock, the outer transverse beam is again activated before the inner transverse beam is deactivated.

The beam is routed, for example, by means of deflecting mirrors from the transmitter to the receiver; the transmitting/receiver apparatus preferably comprises optical barriers.

According to a preferred embodiment of the invention, the beam transmitting/receiving apparatus generates a beam curtain which may be a spread-out light bundle with parallel oriented rays or a sweeping light beam. If by virtue of interrupting one of the light beams the machine has already been brought to a standstill, the light curtain secures an entire surface, that is, a light curtain encloses the safety or danger zone.

Expediently, a helium-neon laser source is used as a beam transmitter because laser beams contain parallel light beams and are therefore adapted for spanning large distances without the need for complex focusing optics. Thus, it is possible, by using a single laser beam-generating source with corresponding mirrors, to guide a single beam at different heights several times about the entire danger zone to thus provide a light curtain.

Expediently, separate signalling devices are arranged at the beginning and at the end of the loading station. Preferably, the signalling device is a switching arrangement which may be actuated by a contacting device. The contacting device is, in turn, activated preferably directly by the transport vehicle or the shuttle carriage so that no separate command is needed. If the contacting device is mounted on the transport vehicle, then, as the transport vehicle enters, it triggers a first contact which, by virtue of the signalling device, opens the lock (that is, it deactivates the outer transverse beam). As the transport vehicle exits, a second contact is triggered, which effects activation of the outer transverse beam. Similar considerations apply to the shuttle carriage which passes through the inner lock gate, opening and closing the same.

Instead of a combination of a switching arrangement with a contacting device, according to a further embodiment of the invention, the signalling device includes an infrared transmitter and an associated infrared receiver. The infrared transmitter is expediently attached to the transport vehicle and/or the shuttle carriage, whereas the infrared receiver of the monitoring control is expediently associated with the monitoring circuit of the danger zone delimiting and securing apparatus.

According to a further feature of the invention, the signalling device too, formed of the switching arrangement and the contacting device is operatively coupled with the monitoring circuit which may be part of a monitoring control apparatus which runs the bale opening system.

DESCRIPTION OF THE PREFERRED EMBODIMENTS

Figure 1:
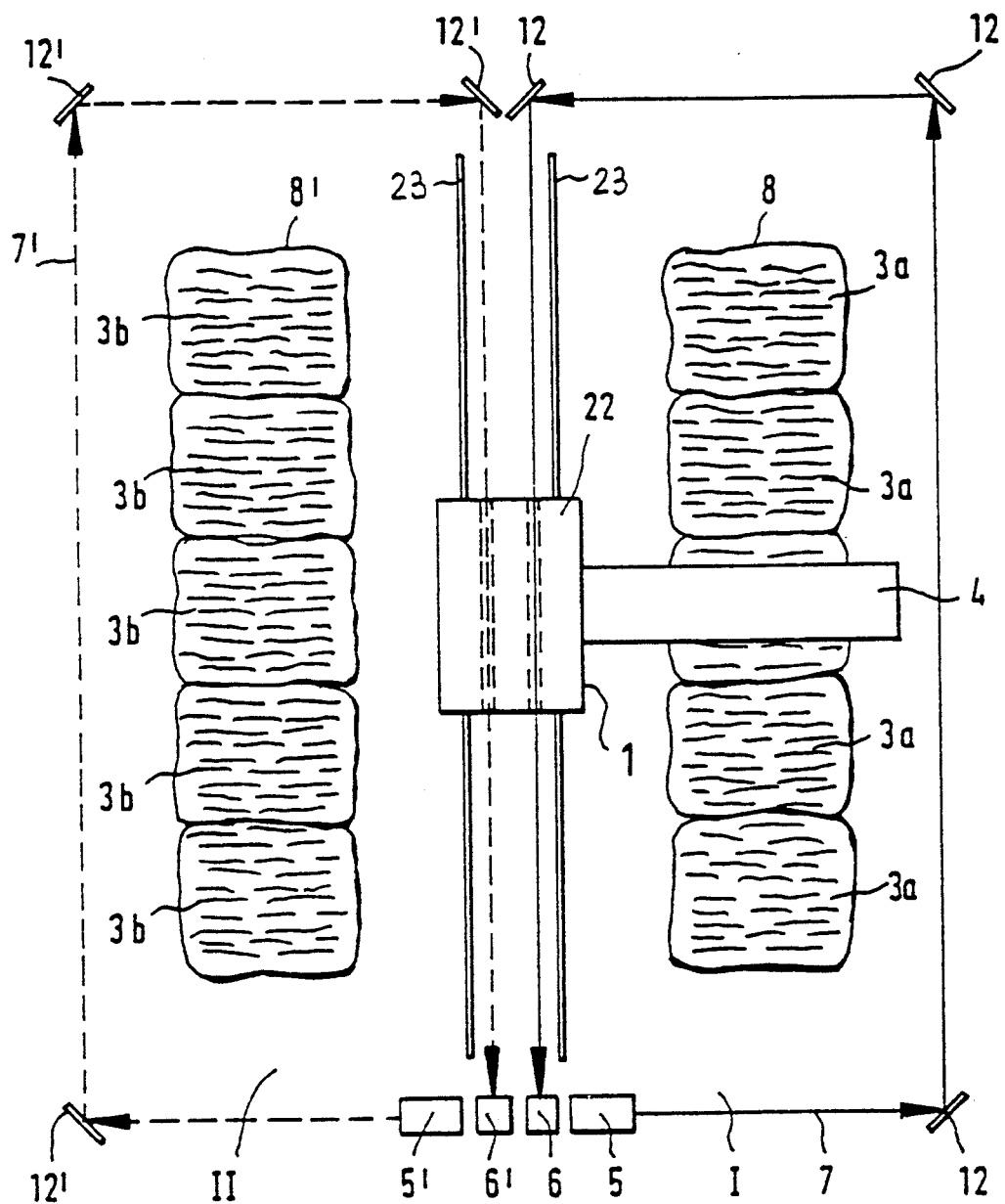
FIG. 1 is a schematic top plan view of a danger zone delimiting and securing arrangement according to the prior art, associated with a first type of bale opening system.

Turning to FIG. 1, the prior art construction illustrated therein shows a first type of bale opening system including a bale opener 1 which may be a BLENDOMAT BDT 019 model manufactured by Trützschler GmbH & Co. KG, Mönchengladbach, Germany. The bale opener 1 has a detaching device 4 which is supported in cantilever fashion by a bale opener tower 22 mounted on rails 23 for back and forth travel. Alongside the travel path of the bale opener 1 two fiber bale series 8 and 8' are set on the ground. The bale opener has two alternatingly effective danger zones I and II, dependent upon whether the horizontally swingable detacher 4 is moving over and along the bale series 8 (as depicted in FIG. 1) or the bale series 8'.

The bale opener 1 is associated with a conventional danger zone delimiting and securing apparatus also shown in FIG. 1. The apparatus includes a transmitter 5 which generates a light beam 7 which is reflected by three mirrors 12 to fully surround the danger zone I before impinging on a receiver 6. After the bale opener 1 has consumed (fully detached) the bales of the series 8, the tower 22 is rotated about a vertical axis 180° so that the detaching device 4 will swing above the fiber bale series 8'. This renders the danger zone I ineffective, while rendering the danger zone II effective. Simultaneously with such a swinging motion a beam transmitter 5' is activated to emit a beam 7' which is reflected by three mirrors 12' to fully surround the danger zone II before impinging on a receiver 6'. As the detaching device 4 reaches its end position above the bale series 8', the transmitter 5 is deactivated so that the danger zone I is no longer secured (protected) by the beam transmitting/receiving apparatus 5, 6 and thus in this zone (the danger zone I) a new fiber bale series 8 may be set up.

Figure 2:
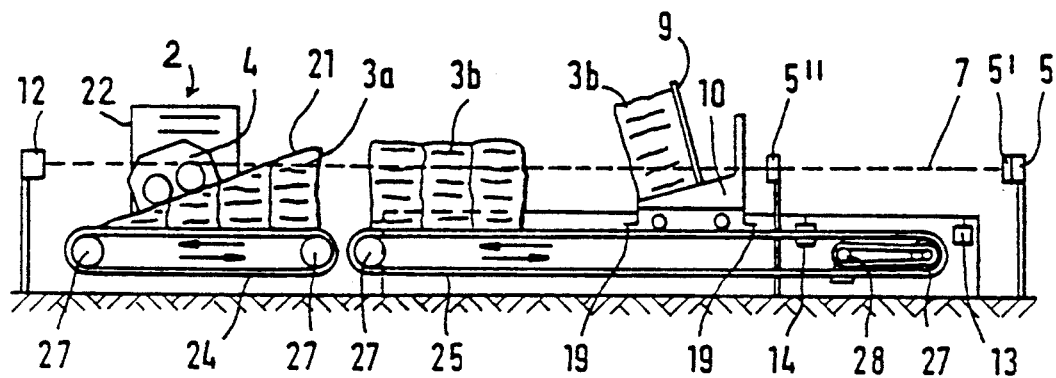
FIG. 2 is a schematic side elevational view of a second type of bale opening system, incorporating a preferred embodiment of the invention.
Figure 3:
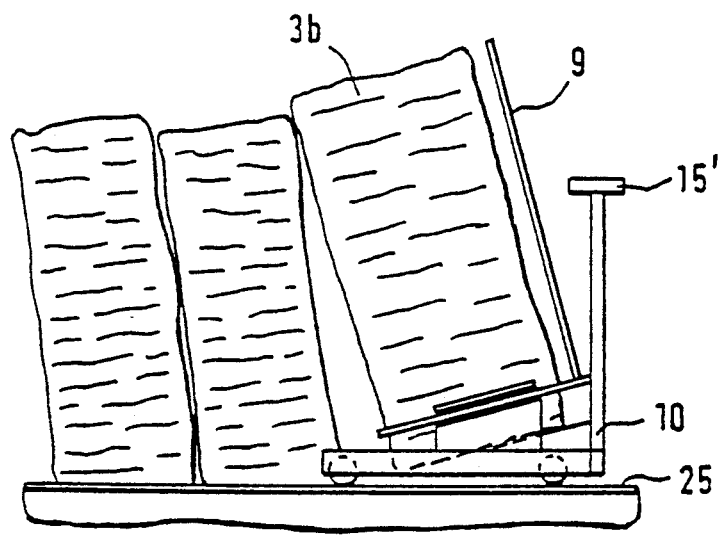
FIG. 3 is a schematic side elevational view of some of the components of the second type of bale opening system.

Turning to FIG. 2, there is illustrated therein a second type of bale opening system in which a bale series formed of fiber bales 3a is supported on the upper run of a transporting conveyor belt (working belt) 24, while a travelling bale opener 2 detaches fiber tuft from the upper surfaces of the fiber bales 3a. The bale opener 2 which may be a BDT 020 model, manufactured by Trützschler GmbH & Co. KG, Mömchengladbach, Germany shapes an inclined top bale surface 21a as it performs the fiber tuft detaching operation during its travel back and forth along the working belt 24. As it may be observed in FIG. 2, the fiber bales 3a, because of the inclined detaching surface 21, are being consumed gradually from the left. Therefore, a continuous detaching operation may take place if, as the leftmost fiber bale is about to be entirely consumed, a new fiber bale (standby bale) 3b is added to the working belt 24 from a transport conveyor belt (reserve belt) 25 on which full-height standby fiber bales 3b are lined up. Such a resupply from the reserve belt 25 onto the working belt 24 is effected by moving the upper run of the reserve belt 25 towards the left by means of a belt driving mechanism, including, for example, a drive 28 transmitting a driving torque on one of the two end rollers 27 which support the reserve belt 25. The reserve belt 25 is, in turn, resupplied with standby fiber bales 3b by a shuttle carriage 10 which moves over the reserve belt 25 to a location adjoining the last-deposited standby bale 3b and places next to it a new fiber bale 3b by means of an unloading mechanism shown in FIG. 3 and forming part of the shuttle carriage 10. The unloading mechanism has no bearing on the invention; shuttle carriages and unloading mechanisms are described, for example, in U.S. patent application Ser. No. 07/936,645, filed Aug. 28, 1992.

The danger zone delimiting and securing system according to the invention is preferably associated with the second type of bale opening system described above in conjunction with FIGS. 2, 3 and will now be discussed in conjunction with FIGS. 4–8.

Figure 4:
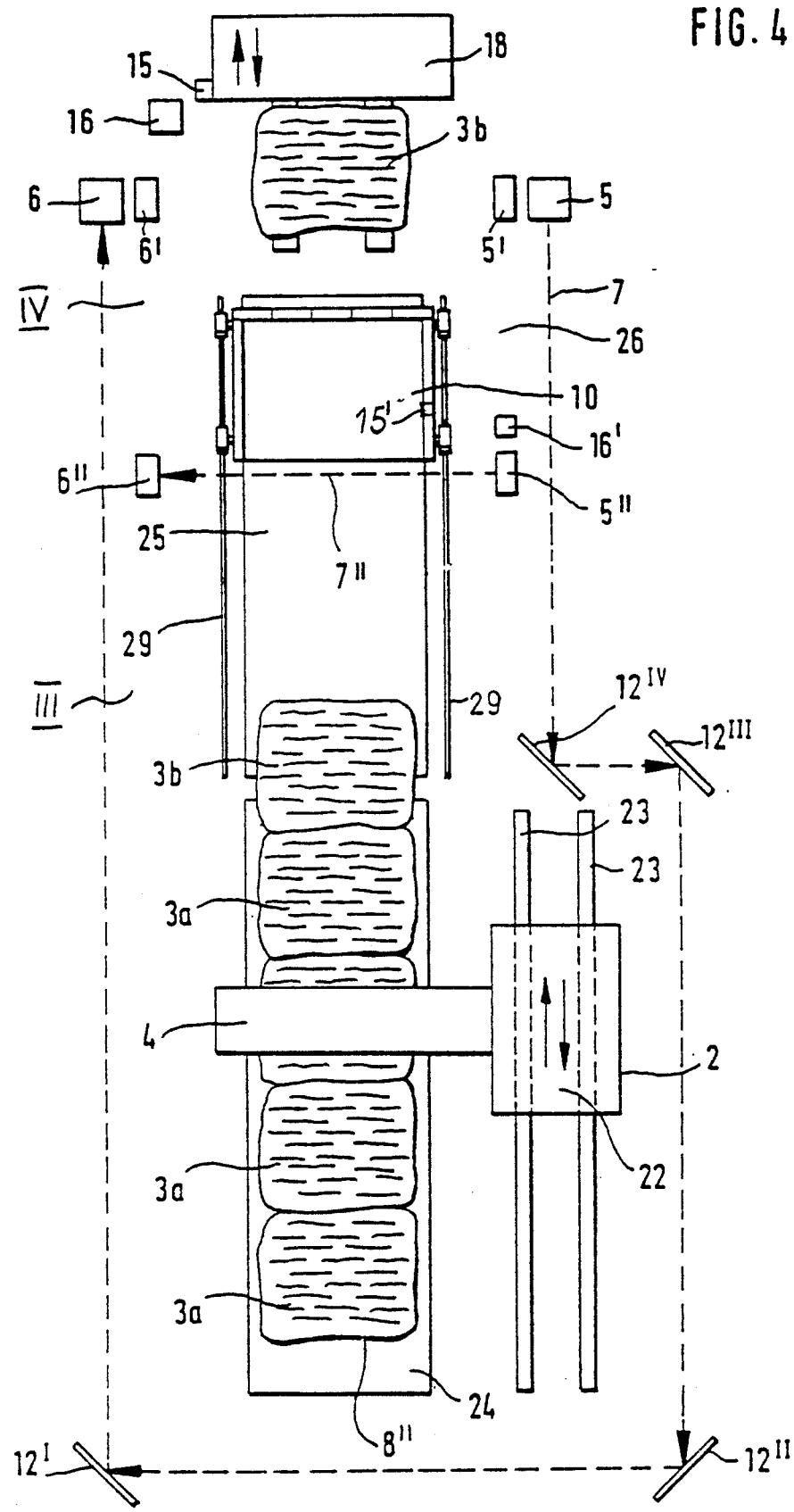
FIGS. 4 to 7 are schematic top plan views of the second type of bale opening system incorporating a preferred embodiment, illustrated in four different operational states.

Turning to FIG. 4, the shuttle carriage 10 is shown in an end position of its travel where it may receive a bale 3b from a transport vehicle 18 in a loading station 26.

Figure 5:
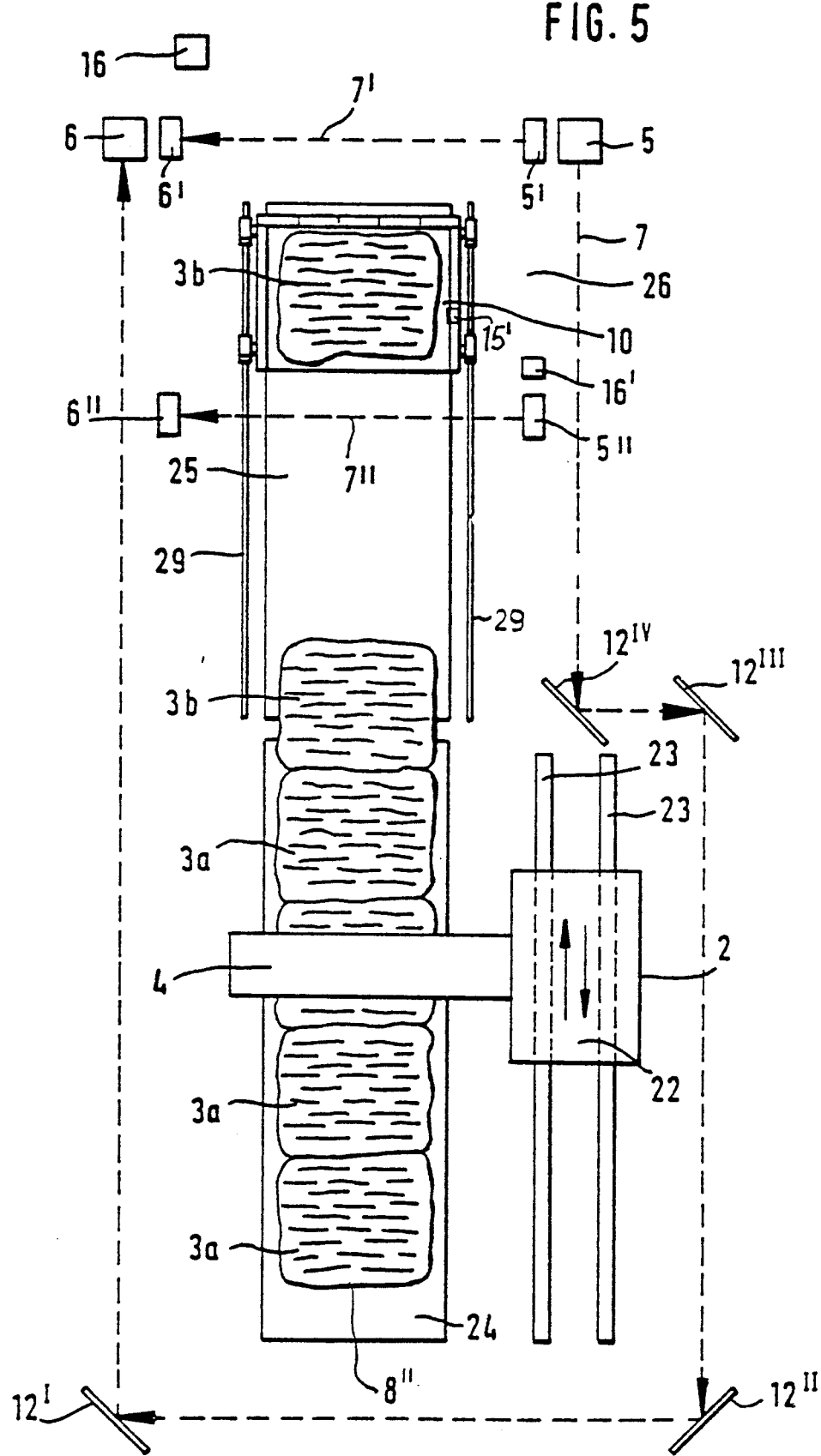

Turning in particular to FIGS. 4 and 5, a danger zone III surrounded on three sides by the beam 7 includes the shuttle carriage loading station 26, the reserve belt 25, the working belt 24, the bale opener 2 and the bale series 8" supported essentially on the working belt 24. The beam 7, as it is consecutively reflected by mirrors $12^{IV}$, $12^{III}$, $12^{II}$ and $12^{I}$ from the transmitter 5 to the receiver 6 describes a generally U-shaped course. As shown in FIG. 5, the legs of the "U" are connectable at their free ends by a beam 7' emitted by a transmitter 5' and detected by a receiver 6'. As shown in FIG. 4, spaced from the beam 7', the legs of the "U" are also connectable by a beam 7" emitted by a transmitter 5" and detected by a receiver 6". The zone bounded by the beams 7' and 7" as well opposite terminal leg portions of the beam 7 form a lock which constitutes a danger zone IV situated within the confines of the danger zone III. The beam 7', designated as the outer transverse beam, is more remote from the base of the U-shaped beam course than the beam 7", designated at the inner transverse beam. By activating the transmitter 5" and the receiver 6" and thus generating the beam 7", the danger zone III is separated from the danger zone IV, and by deactivating the transmitter 5' and the receiver 6', thus removing the beam 7', the danger zone IV remains unprotected and is consequently accessible from the outside as shown in FIG. 4.

Figure 8:
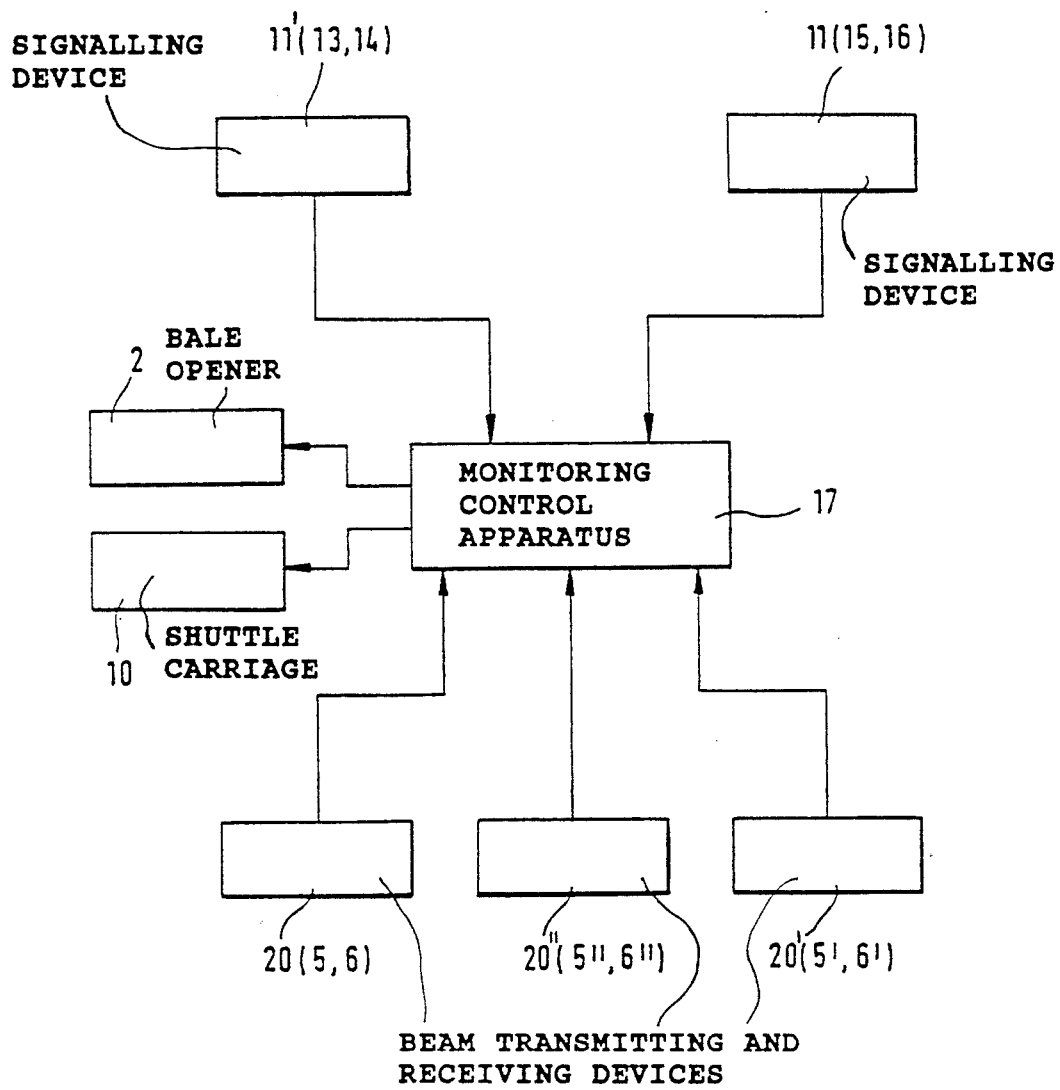
FIG. 8 is a block diagram of the securing apparatus according to a preferred embodiment of the invention.

Also referring to FIG. 8, if a bale transporting vehicle 18 such as a forklift, loaded with a fiber bale 3b enters the loading station 26, as illustrated in FIG. 4, a signalling device II applies a signal to the monitoring control circuit 17 which deenergizes the beam transmitting-/receiving apparatus 5', 6' (thus opens the gate to permit entry) and at the same time, activates the beam transmitting/receiving apparatus 5", 6" to generate the beam 7". The shuttle carriage 10 is in its initial position, that is, at the beginning of the rails 29 extending along both sides of the reserve belt 25 and is thus ready to receive a fiber bale from the transport vehicle 18 as illustrated in FIG. 4. The signalling device 11 has a triggering component (infrared transmitter) 15 carried on the transport vehicle 18 and a stationary, responding component (infrared detector) 16 situated in an entrance region of the loading station 26. This automatic operation replaces a manual triggering of the signalling device 11 by a switch situated just outside the loading station 26. Such a conventional arrangement would increase the risks that personnel wander into the danger zone.

Thereafter, the transport vehicle 18 transfers the fiber bale 3b to the shuttle carriage 10 and moves out of the region of the lock (danger zone IV). The shuttle carriage 10 may start travelling with the fiber bale 3b towards the working belt 24 as soon as the outer lock gate is closed, that is, as soon as the beam transmitting-/receiving apparatus 5', 6' is activated to generate the outer transverse beam 7'. This state is illustrated in FIG. 5. Thus, the shuttle carriage 10 is situated in the region between the two lock gates, that is, between the two transverse beams 7' and 7".

Figure 6:
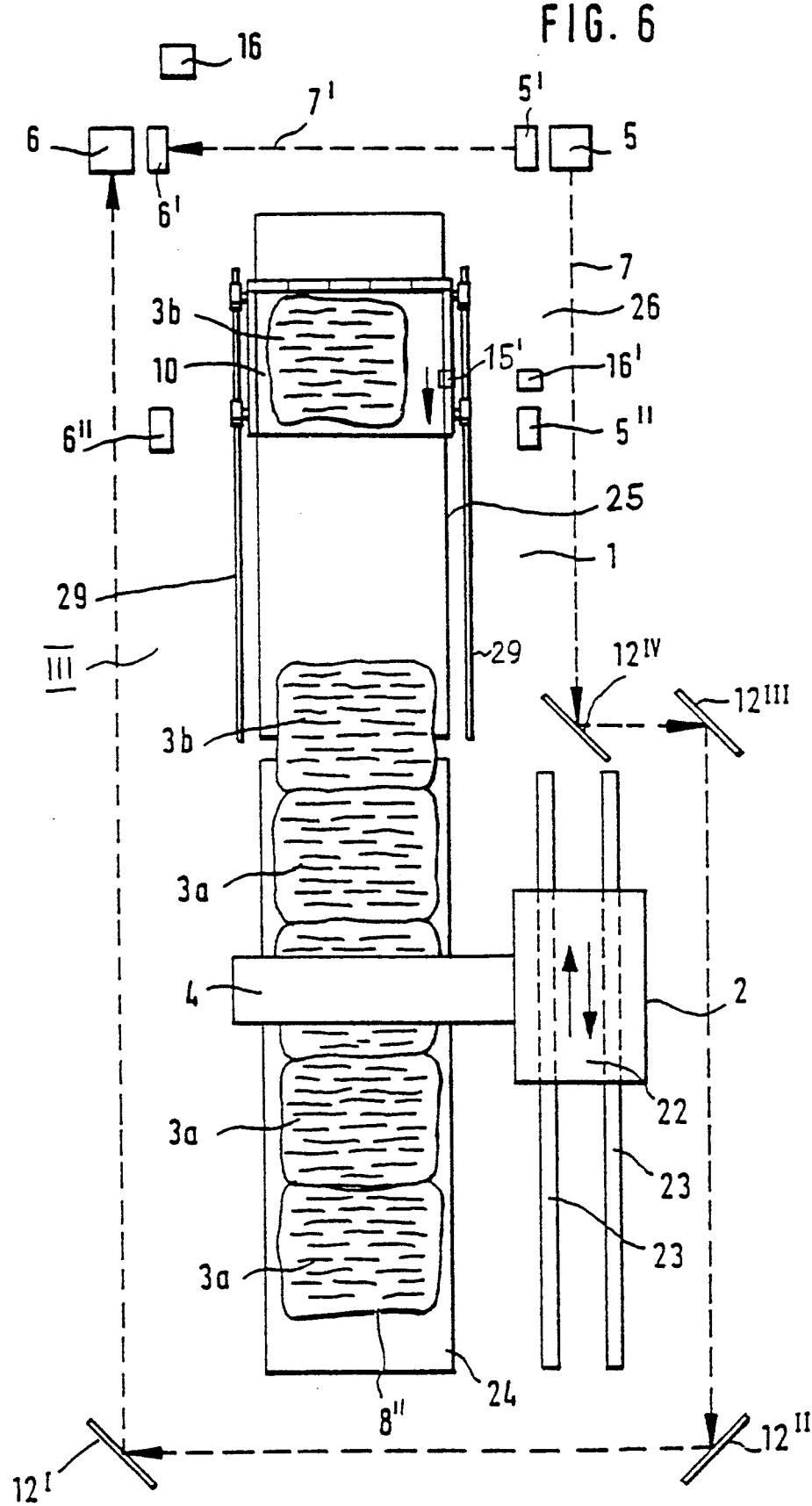

Referring to FIGS. 2 and 6, if now the shuttle carriage 10 approaches the second lock gate constituted by the inner transverse beam 7", a signalling device 11' opens the second lock gate, that is, deactivates the beam transmitting/receiving apparatus 5'', 6'', whereupon the inner transverse beam 7'' disappears. The signalling device 11' has triggering components (contacting devices) 19 mounted on the shuttle carriage 10 and stationary, responding components (switches) 13, 14 situated in the danger zone IV. The outer lock gate, that is, the outer transverse beam 7' is present during the motion of the shuttle carriage 10 toward the working belt 24, that is, the entire danger zone III which now includes the area of the danger zone IV is secured. During the travel of the shuttle carriage 10 or during the transfer of the fiber bale 3b from the shuttle carriage 10 onto the reserve belt 25, the transport vehicle 18 cannot deactivate the outer gate constituted by the outer transverse beam 7'. A visual warning signal such as a red light forbids entrance of a transport vehicle 18 across the beam 7' into the danger zone III.

Instead of contact switches 13, 14, 19 associated with the shuttle carriage 10, an infrared transmitter 15' may be mounted on the carriage 10, triggering a stationary infrared receiver 16' as shown in FIGS. 3–7.

Figure 7:
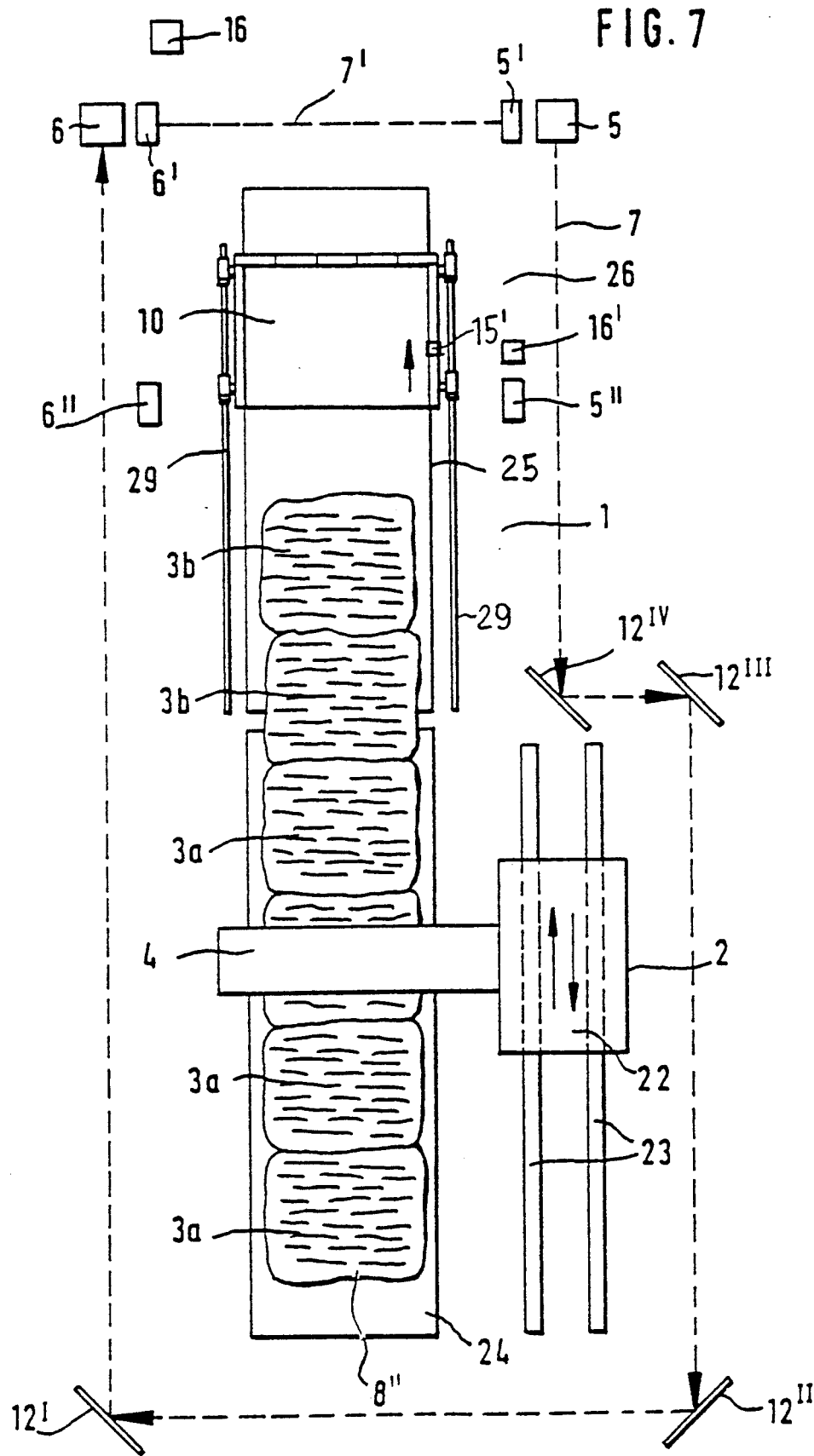

FIG. 7 illustrates the operational phase in which the shuttle carriage 10, after depositing a standby bale 3b on the reserve belt 25 has returned into its starting position and is thus awaiting the arrival of a transport vehicle 18 to receive a fiber bale therefrom, as described in connection with FIG. 4.

FIG. 8 shows a block diagram of the bale opening system, including the danger zone delimiting and securing system according to the invention. The latter includes the beam transmitting/receiving apparatus 20 formed of the transmitter 5 and the receiver 6, the beam transmitting/receiving apparatus 20' formed of the transmitter 5' and the receiver 6' and the beam transmitting/receiving apparatus 20'' formed of the transmitter 5'' and the receiver 6''. The monitoring control apparatus 17 operates the bale opener 2 and the shuttle carriage 10, and further processes signals from the signalling devices 11, 11' and accordingly controls the beam transmitting/receiving devices 20' and 20''.

It will be understood that the above description of the present invention is susceptible to various modifications, changes and adaptations, and the same are intended to be comprehended within the meaning and range of equivalents of the appended claims.

What is claimed is:

1. In a combination of a bale opening system with an apparatus for securing danger zones in the bale opening system;

the bale opening system including
a first conveyor belt for supporting thereon a first series of fiber bales; said first conveyor belt having opposite first and second ends;
a bale opener travelling back-and-forth along the first conveyor belt and detaching fiber tufts from upper surfaces of the bales of the first series;
a second conveyor belt for supporting thereon a second series of fiber bales; said second conveyor belt having opposite first and second ends; said second conveyor belt being so positioned relative to said first conveyor belt that bales of the second series are transferable from said second end of said second conveyor belt onto said first end of said first conveyor belt by moving said second conveyor belt;
a shuttle carriage movable back-and-forth along said second conveyor belt from a loading station where the shuttle carriage receives a fiber bale to a location where a second fiber bale is deposited by the shuttle carriage onto said second conveyor belt;
the improvement wherein said apparatus comprises
(a) a first beam generating means for generating a first beam;
(b) a first beam receiving means for detecting said first beam;
(c) guide means for guiding said first beam in a generally U-shaped course from said first beam generating means to said first beam receiving means; a space between legs of the U-shaped course accommodating the first and second conveyor belts, the bale opener in any position along a path of travel thereof, the shuttle carriage in any position along a path of travel thereof and at least one part of the loading station;
(d) a second beam generating means for generating a second beam having a course connecting legs of the U-shaped course in a zone of said loading station;
(e) a second beam receiving means for detecting said second beam;
(f) a third beam generating means for generating a third beam having a course connecting legs of the U-shaped course in a zone of said loading station; said second beam being more remote from a base of said U-shaped course of said first beam than said third beam;
(g) a third beam receiving means for detecting said third beam; and
(h) switching means for selectively activating and deactivating said second and third beam generating means.

2. The combination as defined in claim 1, wherein said loading station has first and second end zones; said first end zone being more remote from said base of said U-shaped course of said first beam than said second end zone; further wherein said switching means comprises a first signalling device having an actuating member mounted on a transport vehicle carrying a fiber bale into the loading station and a responding member stationarily supported in said first end zone of said loading station; said switching means further comprising a second signalling device having an actuating member mounted on said shuttle carriage and a responding member stationarily supported at said second end zone of said loading station, whereby said first and second beam generating means are selectively activated and deactivated as said shuttle carriage or a transport vehicle leaves or enters said loading station.

3. The combination as defined in claim 1, wherein said guide means include reflecting mirrors for guiding said first beam from said first beam generating means to said first beam receiving means.

4. The combination as defined in claim 1, wherein at least one of said first, second and third beam generating and receiving means includes an optical barrier.

5. The combination as defined in claim 1, wherein at least one of said first, second and third beam generating means includes means for generating a light curtain.

6. The combination as defined in claim 1, wherein at least one of said first, second and third beam generating means includes means for generating a helium-neon laser beam.

7. The combination as defined in claim 1, further comprising a monitoring control apparatus connected to said first, second and third beam generating means, said first, second and third beam receiving means and said switching means.

8. The combination as defined in claim 7, wherein said actuating members of said first and second signalling devices comprise an infrared radiating source for generating a respective infrared beam and said responding members of said first and second signalling devices comprise an infrared detector.

9. The combination as defined in claim 7, wherein said actuating and responding members of said first and second signalling devices comprise mutually contacting switch members.

10. The combination as defined in claim 1, wherein said switching means comprises a signalling device having an actuating member carried by said shuttle carriage and a responding member stationarily supported at a location along the path of travel of said shuttle carriage for switching from one of said first and second beam generating means to the other of said first and second beam generating means as said shuttle carriage enters or leaves said loading station.

11. The combination as defined in claim 10, wherein said actuating and responding members of said signalling device comprise mutually contacting switch members.

12. The combination as defined in claim 10, wherein said actuating member of said signalling device comprises an infrared radiating source for generating an infrared beam and said responding member of said signalling device comprises an infrared detector.

* * * * *